UNITED STATES PATENT OFFICE.

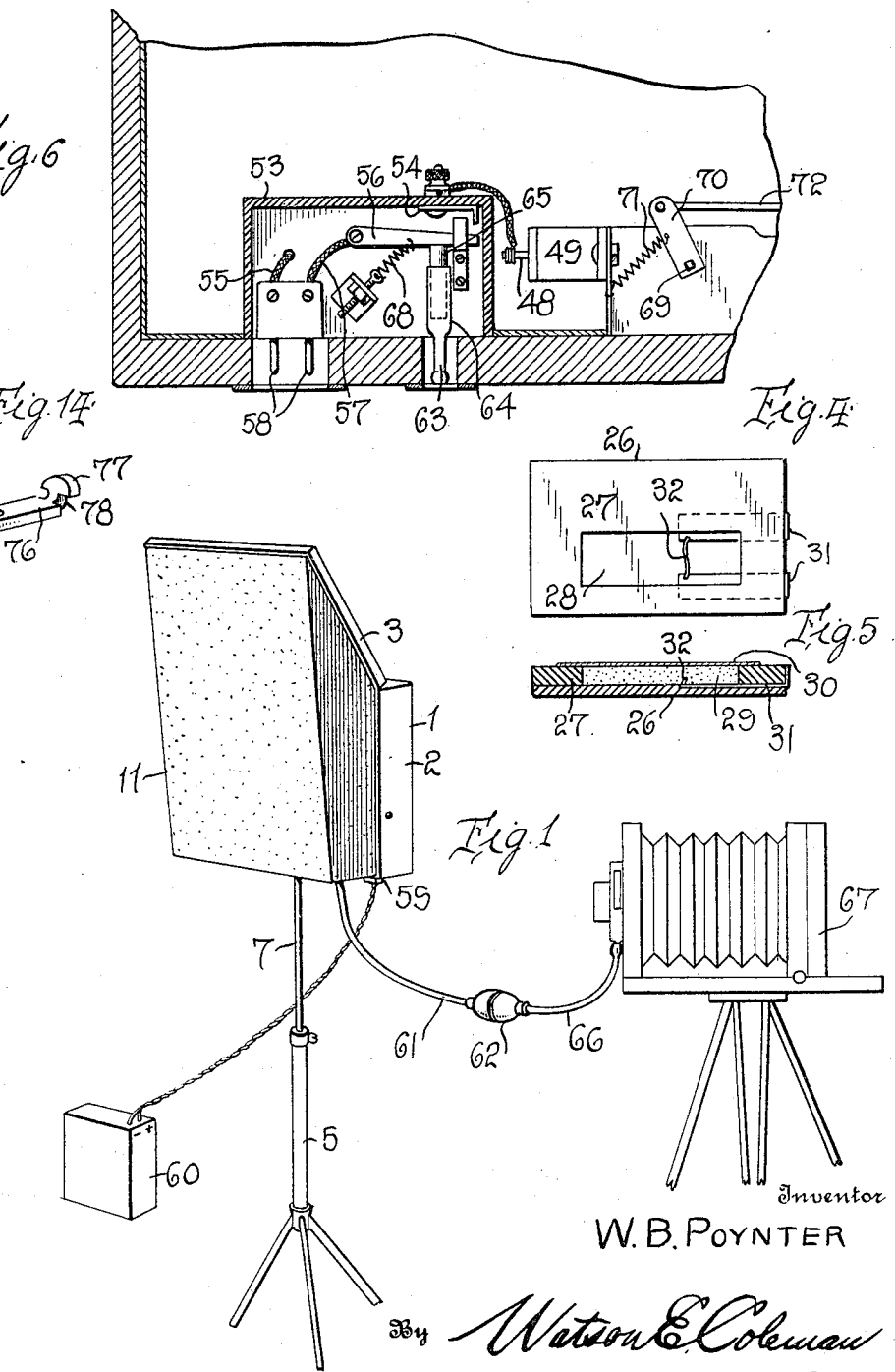

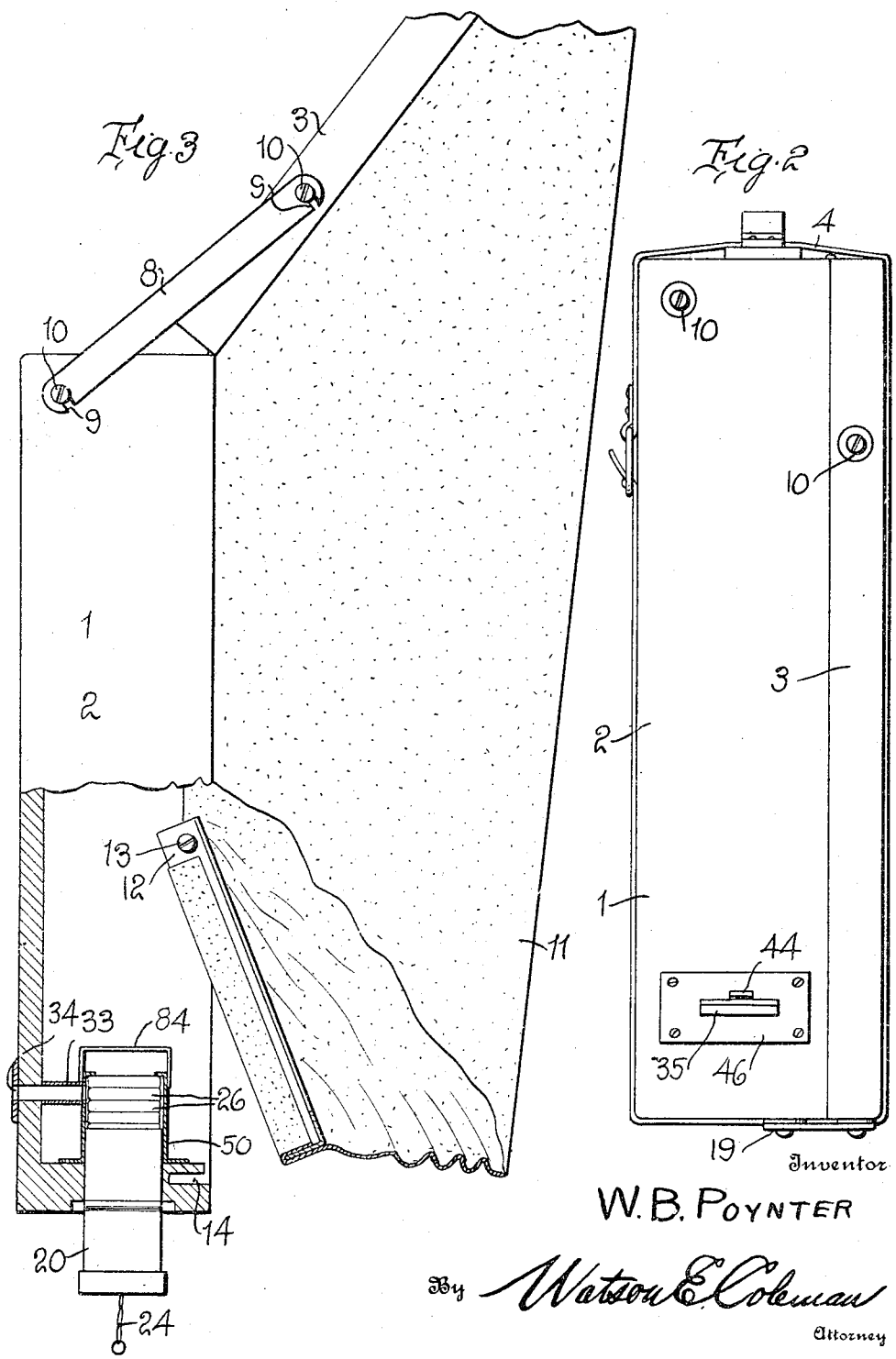

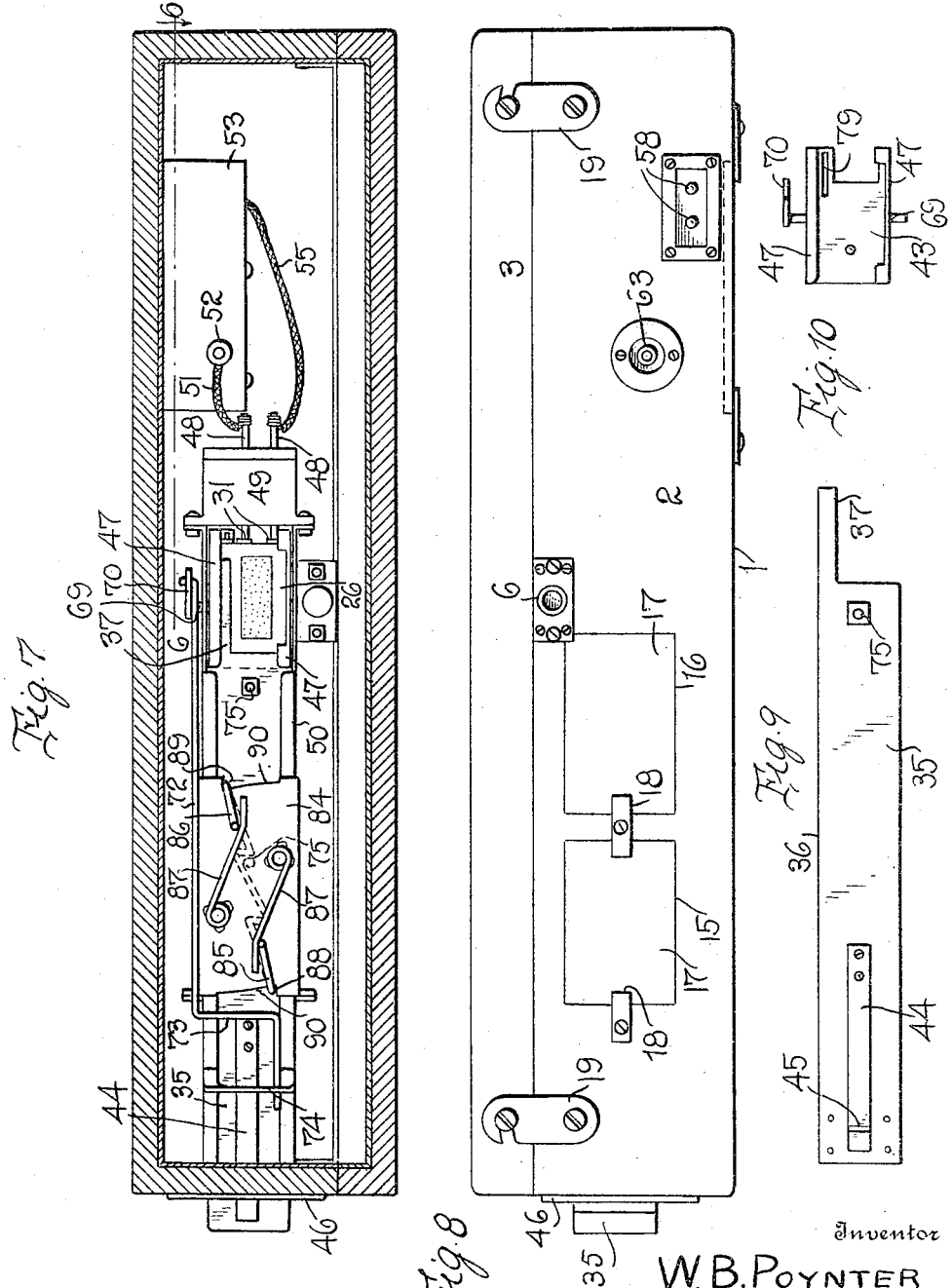

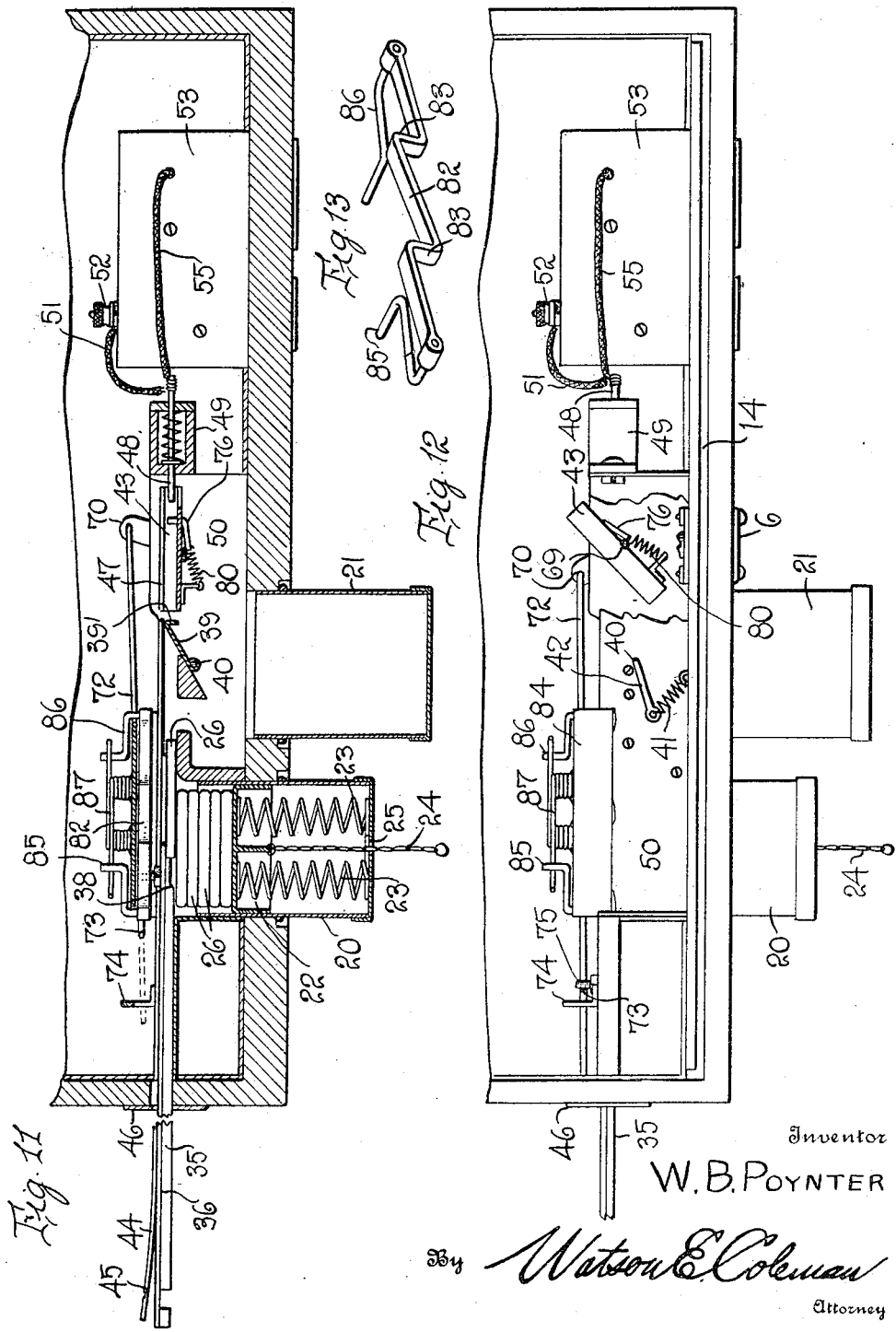

WILLIAM B. POYNTER, OF CINCINNATI, OHIO, ASSIGNOR OF ONE-HALF TO WILLIAM E. MAYER, OF CINCINNATI, OHIO.

PHOTOGRAPHIC FLASH-LIGHT APPARATUS.

1,210,834.  Specification of Letters Patent.  Patented Jan. 2, 1917.

Application filed September 25, 1915. Serial No. 52,653.

*To all whom it may concern:*

Be it known that I, WILLIAM B. POYNTER, a citizen of the United States, residing at Cincinnati, in the county of Hamilton and State of Ohio, have invented certain new and useful Improvements in Photographic Flash-Light Apparatus, of which the following is a specification, reference being had to the accompanying drawings.

This invention comprehends certain new and useful improvements in photographic supplies or accessories, and relates particularly to flashlights or lamps of the electric ignition type.

The invention has for its primary object a very efficient device of this character which will be absolutely safe in operation and very desirable, if not indispensable for both professional and amateur work, the inherent features of safety which the apparatus possesses making it adaptable and capable of fulfilling the requirements in every way in the home, as well as in connection with studio work.

A further object of the invention is an apparatus of this character which, owing to its relative simplicity, durability, and ease of operation, can be manufactured at comparatively low cost and sold at a profit and yet not at a high figure, this feature also rendering the device desirable for amateur work where, for example, the owner of a camera cannot afford to go to any considerable expense, particularly for adjuncts or appliances, while at the same time the ownership of a device of this kind will enhance to a great degree the attractiveness incidental to ownership of a camera, and increase the artistic effects produced, the features of safety hereinbefore referred to rendering the apparatus capable of operation by even children, and thus obviating completely the objection of fire risk which accompanies the use of flashlights of the ordinary open pan and flame ignition or similar type.

The invention has for a still further object a novel and useful flashlight apparatus in which the charges of powder are in the form of cartridges that may be very safely handled, means being provided whereby a plurality of these cartridges may be loaded into the magazine and in an absolutely safe manner transferred by mechanical means, at the will of the operator into the firing position and without any danger of any flame finding access to the remaining cartridges stored in the magazine.

A still further object of the invention is a device of this character, embodying improved and efficient means whereby the smoke will be prevented from accidentally coming out into the room and whereby it may be very easily discharged or emptied from the bag of the apparatus in a most convenient and expeditious manner, and without the necessity of forming any opening in the bag itself.

The invention still further aims to provide a very durable and efficient construction of flashlight or lamp wherein means are embodied for automatically discharging a spent or fired cartridge from the firing chamber or tray into a suitable receptacle with which the device is provided, by and upon the movement of the cartridge transferring slide to its initial position preparatory to moving a fresh cartridge into place, means being also provided whereby the spent cartridge will be automatically discharged and positively moved into the spent cartridge receptacle, before a fresh cartridge can be moved out of the magazine toward the firing position, thus rendering it absolutely impossible for the operator, through inadvertence, inexperience, or inattention, to clog up the machine or to move one cartridge from the magazine toward the firing chamber until the already fired cartridge has been automatically expelled from the latter.

The invention also aims to provide an improved flashlight or lamp whereby a simultaneous operation of the flashlight and the shutter of the camera may be performed with absolute precision, and whereby there will be no liability of any misfire, so that the photographer, whether professional or amateur, may be certain that every exposure will be properly accounted for and secure the desired results, so far as the shutter operating mechanism of the camera and my improved apparatus are concerned.

The invention still further aims to provide an apparatus of this kind in which, as hereinafter indicated, the spent cartridge will not only be automatically dropped from the firing chamber or tray into the receptacle provided for that purpose, but will be positively moved from the chamber to the receptacle upon the withdrawing movement of the transferring slide, so that all liability of the failure of the tray to work in discharging the spent cartridge will be precluded.

The invention further aims to provide a device of this kind wherein the parts are so arranged that the required electrical connections will be fully maintained only when the parts are in their proper correlated positions, whereby all danger of a premature firing of the cartridge as, for example, by the operator stepping or accidentally otherwise pressing upon the bulb will be prevented, the cartridge transferring slide being preferably provided, with this in view, with a spring latch which will "click" into locked position when the parts are properly set and the required electrical connections secured, thereby audibly apprising the operator that the device is in readiness for actuation. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawings, in which—

Figure 1 is a view in the nature of a diagram, showing my improved flashlight apparatus operatively connected to a camera and to a source of electrical supply. Fig. 2 (Sheet 2) is a view showing the box or housing of the apparatus in closed position ready to be carried from one place to another, in the nature of a satchel or handgrip. Fig. 3 is an enlarged side elevation with parts broken away, illustrating particularly the means whereby the housing may be opened conveniently when it is desired to empty out the smoke or products of combustion and without the necessity of having any opening formed in the bag itself. Fig. 4 (Sheet 1) is a plan view of one of the cartridges, the powder and protective layer being omitted. Fig. 5 is a longitudinal sectional view of a cartridge with the powder therein and with the protective layer of tin-foil or the like over the same. Fig. 6 is a fragmentary sectional view, the section being taken approximately on the line 6—6 of Fig. 7 (Sheet 3), looking in the direction of the dart. Fig. 7 is a horizontal sectional view through the housing showing the operating parts in plan. Fig. 8 is a bottom plan view of the box or housing in closed condition. Fig. 9 is a detail plan view of the cartridge transferring slide bar. Fig. 10 is a similar view of the cartridge firing chamber or tray. Fig. 11 (Sheet 4) is a vertical longitudinal sectional view through the bottom portion of the housing with parts shown in side elevation. Fig. 12 is a side elevation looking into the bottom portion of the box or housing, one part therein being shown broken out to illustrate the firing chamber or tray in its tilted or discharging position. Fig. 13 is a detail perspective view of a ratchet safety latch bar employed, and Fig. 14 (Sheet 1) is a detail perspective view of a positively acting ejecting device for the spent cartridges.

Corresponding and like parts are referred to in the following description and designated in all of the views of the accompanying drawings by like reference characters.

Referring to the drawings, the numeral 1 designates as a whole the housing for the operating parts of my improved flashlight or lamp, the same being preferably in the form of a leather or other covered box of rectangular or other suitable shape or size capable of supporting the required parts, and preferably in the form of a suit-case or the like, with a body portion 2 and a hinged lid or cover 3, the parts being shown in closed position in Fig. 2, and indicating that the entire apparatus may be very easily and conveniently carried in the hand from place to place as, for example, by having a shawl strap 4 extend therearound.

In operation, the housing 1 is supported in a substantially vertical position, as clearly illustrated in Figs. 1 and 3, upon a tripod or any other suitable form of stand, as indicated at 5, said stand being preferably of the vertically adjustable type, whereby the desired elevation of the apparatus may be secured and the bottom of the housing being formed with a socket piece 6 (Fig. 8) for the reception of the uppermost rod-like member 7 of the stand, this arrangement providing means whereby the apparatus may be very quickly and easily set up and the light turned to the required position, and subsequently detached or knocked down when no longer required for use. When not in use, the lid or cover 3 is raised and held in an upwardly extending position relative to the body 2 of the housing by any desired means as, for example, through the instrumentality of a bar 8 having notches 9 in its ends for engagement with the screw studs 10 or the like with which one side of the lid and body are provided, as clearly illustrated in Fig. 3, and as the flexible muslin or similar bag 11 is secured to the margins of the lid and body, it is obvious that upon the raising of the lid the bag will be properly distended, as required. Preferably the lower portion of the bag 11 is secured at its margins to a substantially rectangular or U-shaped frame 12 which is pivotally connected at its ends to the inner side walls of the body 2 of the box or housing 1, as clearly indicated at 13 in Fig. 3, the material out of which the bag is formed being bound over the angular edges of this frame, as shown, and serving as a packing for the opening thus provided, the cross bar of the frame and the binding carried thereby being designed to snugly fit within a recess 14 formed in the bottom of the box body so that it will be securely held therein by frictional engagement and the bag tightly sealed when in operation, this construction and arrangement of the parts also rendering it easy for the operator to empty the bag by merely moving the frame outwardly to an oblique position, as illustrated in Fig. 3 and thereby facilitating the emptying of the smoke and other products of combustion out of the box. Furthermore, it will be at once manifest that by providing this pivoted frame 12, access may be readily had to the interior of the body 2 of the box or housing 1 whereby some of the detachable parts hereinafter specifically described, and the battery of dry cells or the like for the supply of the electrical energy and the bulb and its attached hose sections, may be stored within the housing when the apparatus is not required for use.

The box or housing 1 is formed in its bottom with openings 15 and 16 that are closed by panels 17 and turn buttons 18 or the like when the apparatus is not in use, and is further provided on its bottom with pivoted latches 19 for locking the lid 3 in closed position. The opening 15 (see Figs. 11 and 12) is designed to receive and accommodate the cartridge magazine 20, which may be detachably held therein by frictional engagement or otherwise, and the opening 16 is designed to receive or accommodate the spent cartridge receptacle or cup 21 detachably held therein in any desired way.

The cartridge magazine 20 is, in the present embodiment of the invention, provided with a false bottom 22 which is normally pressed upward therein by means of one or more expansion springs 23, and may be retracted and held in retracted position by a chain or other flexible member 24, while the magazine is being filled, said chain being held drawn down in any desired way as, for example, by means of the engagement of its links with the wall of the opening 25 in the bottom of the magazine through which the chain passes.

26 designates the cartridges. These each comprise in the present instance, as best illustrated in Figs. 4 and 5, a rectangular or other shaped block 27 of indurated fiber or the like having an opening 28 of any desired size formed therein for the charge of flashlight powder 29, the charge being preferably covered initially by tin foil 30 or the like. Each cartridge is provided with two contact members 31 which extend into the blocks 27 and up one end thereof in laterally spaced relation to each other, the inner portions of said contact members being connected together by a resistance wire 32 to which the charge of powder is exposed, so that when the circuit is closed, as will be hereinafter more fully described, the charge will be ignited by the fuse 32 and the cartridge thus fired.

The cartridges 26 may be fed into the magazine 20 in any desired way, as, for example, by inserting them into the open end of the magazine before the latter is applied to the opening 15 or by subsequently inserting them into a chute 33 communicating with a feed opening 34 formed in the rear wall of the box body 2, as best illustrated in Fig. 3. To transfer the cartridges one at a time from the magazine to the firing chamber or tray hereinafter described in detail, I have provided a slide bar 35 which is preferably formed of fiber overlaid by a metallic strip 36 which forms a part thereof, and said strip is extended at one end and at one side to form a cartridge holding finger 37, as best illustrated in Figs. 7 and 9, designed to extend over the cartridge 26 as the bar pushes the uppermost cartridge of the superposed series, longitudinally in a horizontal direction from the magazine, this finger preventing the cartridge from being raised, and maintaining it in its true line of travel toward the firing chamber. Preferably, the relatively forward end of the cartridge transferring slide bar 35 is recessed and beveled on its under surface, as indicated at 38 in Fig. 11, whereby it will properly engage with a baffle wall 39 which is pivotally mounted, as at 40, and yieldingly held in its uppermost position by means of a spring 41, operatively connected to a crank arm 42 formed on one end of the shaft 40, on which said baffle is pivoted, so that there will at all times be maintained an effective barrier separating the magazine 20 from the firing chamber 43 into which the cartridge is pushed by the slide bar 35, and consequently all danger or liability of any flame reaching the "live" cartridges is prevented. Referring further to the slide bar 35, it will be seen that it is provided at its rear or outer end with a spring latch 44 secured thereto at one end in any desired way and having its rearwardly extending free end formed in its upper face with a recess or notch 45 designed to snap into a keeper plate 46 secured to one end wall of the box or housing 1, as best illustrated in Fig. 2. Thus the slide will be securely held in its inner operative position when pushed inwardly to transfer a cartridge from the magazine to the firing chamber, and moreover the operator will be obviously apprised, by the click of the latch, that the parts are in their properly correlated positions for the firing operation, so that all premature firing will be obviated, owing further to the fact, as will be hereinafter more fully specified, that until the slide bar 35 has been pushed fully in a cartridge will not be properly transferred to the firing chamber, and moved therein into firm contact with the spring pressed electrodes forming part of the electric circuit. When a cartridge 26 is thus transferred, by the inward movement of the slide bar 35 to the firing chamber or tray 43, and is properly positioned therein, it will be retained therein underneath inturned longitudinally extending flanges 47 with which said tray is provided, and will have its contact members 31 brought primarily into engagement with the spring pressed and yieldable electrodes 48 mounted in a box or casing 49 which is secured in any desired way and supported by the longitudinally extending casing 50 in which the tray 43 is mounted and the slide bar 35 operates. One of these electrodes is connected by a lead 51 to a binding post 52 mounted upon a switch box 53 within the housing 1, said binding post being electrically connected to a relatively stationary switch member 54 within said box. The other electrode is connected to a lead 55 which extends into the switch box 53, and within said box is also mounted a movable switch arm 56 to which a lead 57 is connected. The leads 55 and 57 are electrically connected to plug pins 58 so that a plug 59 may be applied thereto and the circuit closed from a source of electrical supply such as the battery box 60 shown in Fig. 1, when the switch arm 56 is moved into contact with the switch arm 54. This movement is effected in the ordinary way, as, for example, by means of the hose section 61 leading from the bulb 62, and attached to a nipple 63 formed on one end of a cylinder 64 in which is a plunger 65, said plunger engaging the movable switch arm 56 and operating the same to close the circuit when the bulb 62 is squeezed. It is, of course, evident, that any suitable source of electrical supply may be employed instead of a battery. For instance, an electric light current may be used, although in that case as is evident, the strength of the current must be suitably reduced. The bulb 62 has also connected to it a hose section 66 designed to lead to the shutter operating mechanism of the camera 67, as indicated in Fig. 1, whereby the flash will be produced and the camera shutter operated simultaneously, when the bulb 62 is squeezed. As it is known that the shutter operating mechanisms of different makes or types of cameras are not all of the same sensitiveness, I preferably provide an adjustable spring tensioning device 68 for the movable switch arm 56, as clearly illustrated in Fig. 6.

From as much of the description as has preceded in connection with the correlated views of the accompanying drawings, the operation of transferring the cartridge from the magazine 20 to the firing chamber or tray 43 and the subsequent firing of a cartridge by compressing the bulb 62 and the simultaneous operation of the camera 67, will be apparent, and I shall now describe the means whereby the fired or spent cartridge will be automatically and positively expelled from the tray 43 upon the reverse or withdrawing movement of the cartridge transferring slide bar 35, preparatory to moving a fresh cartridge into firing position; and will in this connection also describe the means provided for the purpose of positively preventing any forward or inward movement of the slide bar until it has been fully withdrawn and the spent cartridge discharged from the firing tray.

The chamber or tray 43 is pivotally mounted upon a transversely extending shaft 69 intermediate of its ends, to tilt in a vertical plane for the charge of the fired or spent cartridge, and to accomplish this tilting movement, a crank arm 70 is secured to one end of said shaft, as illustrated in Figs. 6, 7, 11 and 12, said crank arm having connected to it a contractile spring 71, whereby it and the tray will be normally held with the latter in its horizontal position for the reception of a cartridge. A link rod 72 is pivotally connected at one end to the crank arm 70 and extends longitudinally, as best illustrated in Fig. 7, alongside of the casing 50, the other end of said link rod 72 being turned inwardly or laterally offset, as indicated at 73, and thence extending outwardly for guiding movement underneath a transverse yoke bar 74. The offset portion 73 of the link rod 72 is intended to be engaged by an upstanding finger 75 in the form of a rod or pin projecting upwardly from the slide bar 35 upon the retracting or outward movement of the latter, and thus it will be understood that as the slide bar is drawn farther out, the link rod 72 will be pulled upon and by means of the crank arm 70 will move the chamber or tray 43 to a tilted position, such as is shown in Fig. 12. This chamber or tray is provided with a cartridge ejecting member 76, shown in detail in Fig. 14, and formed with an upwardly projecting head 77 and a reduced neck 78 having guiding movement in a slot 79 formed longitudinally in the bottom of the tray 43, and a contractile spring 80 is connected to the bottom of the tray and in an aperture 81 formed in the ejector 76. When the cartridge is moved into the chamber or tray 43, and the head 77 of the ejector 76 is thus engaged thereby, the spring 80 expanded and placed under tension, so that when subsequently the tray is tilted and the end of the cartridge which has been previously held by the downwardly extending edge 39' of the baffle plate 39 is released from said edge, the ejector will be permitted to act and the spring 80 will instantly contract so that the cartridge will be positively expelled from the tray and drop into the receptacle 21, hereinbefore referred to.

To prevent the operator from inadvertently or otherwise partly withdrawing the slide, and subsequently moving it inward to push another cartridge toward the chamber or tray 43 before the latter has been emptied, the following means are provided: A ratchet latch bar 82 shown in detail in Fig. 13, and provided with any desired number of bends, constituting shoulders 83 on opposite sides thereof (there being two of these in the present instance) is mounted underneath a cover plate 84 on the top of the casing 50, and each end of this bar 82 is provided with a relatively rigid upwardly extending angular arm, said arms being designated 85 and 86 respectively, for the purposes of distinction. Oppositely acting springs 87 engage the respective arms 85 and 86, and tend to hold same against the shoulders 88 and 89 formed at the ends of the plate 84 upon opposite sides of the median line thereof, the shoulders being formed at one end of transversely extending recesses 90. Thus, it will be understood that the latch bar 82 may yield at either end, one end constituting its fulcrum while the other end is yielding. Should, then, the operator, upon the withdrawing movement of the slide bar 35, stop the bar at an intermediate point, before the tray 43 has been tilted to discharge its burned or spent cartridge and attempt to force the bar inwardly again, such movement would be prevented or frustrated by the engagement of the pin 75 with one of the shoulders 83, as clearly indicated in dotted lines in Fig. 7, and the same operation would take place at other points in the outward partial movement of the slide bar, according to the number of shoulders provided. But upon the completion of the outward movement of the slide bar and the emptying of the tray 43, this finger or pin 75 would obviously pass around the adjacent end of the bar 82 to the opposite side thereof where a reverse movement would merely result in the finger or pin riding upon the inclined surfaces of the latch bar and no interference with the free movement of the slide bar would take place; and the same is true at the inward end of the movement of the slide bar, as is evident. Thus, it will be seen that there is no possibility of the operator, from any cause, clogging the machine, for it is impossible for him to move the slide bar inward after it has been partially withdrawn, until it has been completely withdrawn and the tray 43 thus automatically emptied.

While the accompanying drawings illustrate what I believe to be the preferred embodiment of my invention, it is to be understood that the invention is not limited thereto but that various changes may be made in the construction, arrangements and proportions of the parts without departing from the scope of the invention, as defined by the appended claims.

What is claimed, is:

1. In a photographic flashlight apparatus, a magazine, a firing chamber spaced from the magazine and adapted to hold flashlight cartridges, a baffle plate yieldably mounted between the magazine and the firing chamber, a cartridge shifting member operable across the end of the magazine and engageable with one cartridge at a time to move it from the magazine to the firing chamber, said cartridge shifting means engaging said baffle plate to shift it out of the way to permit the movement of the cartridge into the firing chamber, and independently operable means for firing the cartridges in said chamber.

2. A photographic flashlight apparatus, including a housing, a firing chamber mounted therein, yieldable electrodes mounted in the housing in juxtaposition to said firing chamber, a magazine adapted to hold a plurality of cartridges in the housing in superposed relation to each other, a slide bar mounted in the housing and operable from the exterior thereof and adapted to move one cartridge at a time from the magazine to the firing chamber into contact with said electrodes, and a latch bar carried by said slide and arranged to lock the slide at the limit of its movement when the cartridge is pushed firmly into contact with said electrodes.

3. A photographic flashlight apparatus, including a housing, a cartridge firing chamber mounted therein, a magazine adapted to hold cartridges in the housing and spaced from said chamber, means for moving the cartridges from the magazine into the firing chamber, means for firing the cartridges in said chamber, and a yieldable baffle wall between the said chamber and said magazine, normally held in position across the end of the firing chamber.

4. A photographic flashlight apparatus, including a housing, a cartridge firing chamber mounted therein, a magazine adapted to hold cartridges in said chamber, and spaced from said firing chamber, means for moving the cartridges from the magazine to the firing chamber, and a spring-held baffle wall between the said chamber and said magazine, and adapted to engage the rear end of a cartridge pushed into the firing chamber.

5. A photographic flashlight apparatus, including a housing, a firing chamber mounted therein, a magazine adapted to hold cartridges in said housing, a reciprocating slide bar mounted in said housing and operable from the exterior thereof and adapted to move the cartridges from the magazine to the firing chamber, a spring-held baffle wall between said chamber and said magazine engageable by the slide bar in its movements and adapted to prevent the passage of flame from the firing chamber into the magazine, and means for firing a cartridge in said chamber.

6. A photographic flashlight apparatus, including a housing, a firing chamber therein, a magazine adapted to hold cartridges in said housing, a slide bar mounted to reciprocate in said housing to push the cartridges from the magazine to the firing chamber, a baffle wall pivotally mounted in the space between the firing chamber and the magazine, and provided with a shaft and a crank arm at one end thereof, a spring connected to said crank arm to hold the baffle wall in its elevated position, said baffle wall being engageable by the slide bar upon the inward movement of the latter, and means for firing a cartridge in said chamber.

7. A photographic flashlight apparatus, including a housing, a firing chamber mounted therein, means operable from the exterior of the housing for moving a cartridge into its said chamber, upon the movement of said means in one direction, and means for automatically discharging a cartridge from the chamber upon the movement of said cartridge moving means in the opposite direction.

8. A photographic flashlight apparatus, including a housing, a tiltable cartridge firing chamber mounted therein, cartridge moving means adapted to move a cartridge into said chamber upon the movement of said means in one direction, and means for automatically tilting said chamber upon the movement of the cartridge moving means in the opposite direction.

9. A photographic flashlight apparatus, including a housing, a tiltable cartridge firing chamber mounted therein, a slide bar movable longitudinally in said housing and adapted to move a cartridge into the firing chamber, and an operable connection between said slide bar and said chamber adapted to tilt the latter upon outward movement of said slide bar.

10. A photographic flashlight apparatus, including a housing, a cartridge firing chamber mounted therein, means operable from the exterior of the housing for moving the cartridge into said chamber, means for firing a cartridge in said chamber, the chamber being provided with a spring-held cartridge ejector engageable by the cartridge and adapted to be placed under tension thereby, and means for automatically permitting said ejector to act whereby it will positively expel the cartridge from said chamber.

11. A photographic flashlight apparatus, including a housing, a tiltable cartridge firing chamber mounted therein, a magazine adapted to hold a plurality of cartridges in said chamber, a slide bar movable in said housing and adapted to transfer a cartridge from said magazine to the firing chamber, a spring actuated cartridge ejector carried by said chamber, a baffle wall between the cartridge firing chamber and the magazine and adapted to engage the rear end of the cartridge in said chamber so as to force the latter into engagement with the ejector and hold the latter in tensioned condition, and means operable upon the withdrawal of said slide bar for automatically tilting said chamber so as to free the edge of the cartridge from the baffle and allow the ejecting device to act.

12. A photographic flashlight apparatus, including a housing, a tiltable cartridge firing chamber mounted therein, a slide bar movable in said housing and adapted to move inwardly therein to carry a cartridge into the firing chamber, the latter being provided with a crank arm, a link rod pivotally connected at one end to said crank arm and extending outwardly along the slide bar, and means carried by the slide bar for engagement with said link rod upon the outward movement of the slide bar whereby to tilt the firing chamber.

13. A photographic flashlight apparatus, including a housing, a firing chamber mounted therein, a slide bar movable inwardly toward said firing chamber to carry a cartridge thereto, and means for automatically preventing a subsequent inward movement of said slide bar until a complete return movement thereof has been effected.

14. In a photographic flashlight apparatus, the combination of a housing, a cartridge firing chamber mounted therein, a slide bar movable inwardly into the housing to carry a cartridge into the firing chamber, means whereby a complete rearward movement of said slide bar will automatically effect the discharge of a cartridge from said chamber, and means for automatically preventing any inward movement of said slide bar until the outward movement is completed.

15. A photographic flashlight apparatus, including a housing, a firing chamber mounted therein, a slide bar movable inwardly in said housing to carry a cartridge to the firing chamber and arranged, upon a full outward movement, to effect a discharge of a cartridge from said chamber, and a double-acting latch bar mounted in juxtaposition to said slide bar and arranged to prevent any inward movement of the latter until a complete rearward or outward movement thereof has been effected.

16. A photographic flashlight apparatus, including a housing, a cartridge firing chamber mounted therein, a slide bar movable in said housing and adapted upon its inward movement to carry a cartridge to the cartridge firing chamber, said slide bar being provided with a finger, a link rod operably connected to said firing chamber and arranged, upon engagement by said finger, in the outward movement of said slide bar to effect the discharge of a cartridge from said chamber, a double-acting ratchet latch mounted in juxtaposition to said slide bar, and means for yieldingly holding the latch in such position that it will be engaged by said finger, and prevent any inward movement of the slide bar until a full outward movement thereof is effected.

17. A photographic flashlight apparatus including a firing chamber, electrodes mounted in the firing chamber at one end thereof, cartridge engaging means adapted to shift a cartridge into the firing chamber and into contact with said electrodes, and means automatically locking said cartridge shifting means when it has moved fully inward preventing a retraction of the cartridge shifting means, said means being manually movable out of its locking position to thereby permit the retraction of the cartridge moving means.

18. A photographic flashlight apparatus including a housing, a cartridge firing chamber mounted therein, a magazine adapted to hold cartridges in the magazine and spaced from said firing chamber, means for moving cartridges from the magazine into the firing chamber, said means including a slide bar moving across the open end of the magazine and moving beyond said open end to the firing chamber, and a baffle disposed within the firing chamber and the magazine and yieldably urged into the path of movement of the slide bar and across the end of the firing chamber but movable out of such position by engagement with the slide bar to permit the insertion of a slide bar into the cartridge chamber.

19. A cartridge for use in photographic flashlight apparatus, the same comprising a body portion provided with an opening for the reception of powder, contact members carried by said body portion, a fuse bridging the contact members in said opening, powder received in said opening in contact with the fuse, and tin foil covering said opening and retaining the powder therein.

20. In a photographic flashlight apparatus, a cartridge firing chamber, means adapted to move a cartridge into said chamber and lock the cartridge in place therein from retraction, and means for automatically ejecting the cartridge from said chamber upon a retraction of said shifting and holding means.

21. A photographic flashlight apparatus including a housing, a cartridge firing chamber mounted therein, a slide bar movable longitudinally in said housing and adapted upon a movement in one direction to shift a cartridge into said firing chamber, and means for automatically ejecting the cartridge from the firing chamber upon the reverse movement of said cartridge moving bar.

22. A photographic flashlight apparatus including a cartridge firing chamber, means for moving a cartridge into the chamber, a cartridge ejector engageable by the cartridge and when so engaged acting to urge the cartridge out of the chamber, means holding the cartridge in said chamber against the action of said ejecting means, means for firing the cartridge, and means for releasing said holding means to permit said ejector to act.

23. A photographic flashlight apparatus including a firing chamber, means for shifting a flashlight cartridge into said chamber, a spring-actuated ejector acting to urge the cartridge in one direction to expel it, a member disposed at the entrance end of the firing chamber, normally held in a position to permit the ejection of a cartridge through said entrance end but shiftable into a position preventing said ejection upon the operation of the cartridge moving means, said member being shifted to release the cartridge upon a retraction of the cartridge moving means, and means for firing the cartridge in the firing chamber.

24. In a photographic flashlight apparatus including a firing chamber, a magazine, means for shifting a cartridge from the magazine into the firing chamber, means for firing the cartridge, means acting upon a reverse movement of said cartridge moving means acting to eject the discharged cartridge in the firing chamber, and means for preventing the insertion of a new cartridge into the firing chamber until the discharged cartridge has been ejected therefrom.

25. In a photographic flashlight apparatus, a supporting frame, a bag operatively connected thereto along a portion of its edge, and a frame pivoted to the first-named frame intermediate the ends thereof and operatively connected to the remainder of the edge of the bag, said last-named frame having a length equal to the distance between its pivotal connection with the first-named frame and the end of said first-named frame whereby said second-named frame may be turned into parallel relation to the first-named frame to thereby distend the bag.

26. In a photographic flashlight apparatus a housing comprising a rectangular box having side walls, a lid hinged to one end of the box, a bag connected thereto, a U-shaped frame having its ends pivotally connected to the side walls of the box intermediate the ends of the box, said frame having a length equal to the distance between its pivotal point and the adjacent end of the box opposite said lid, the lower margin of the bag being connected to said U-shaped frame whereby the U-shaped frame may be turned into parallel relation to the sides of the box to thereby distend the bag entirely over the mouth of the box.

27. In a photographic flashlight apparatus, a housing comprising a box including side and end walls, one of said end walls being formed with a slot extending the length of the end wall and parallel to the inner face of said wall, said slot opening upon the inner edge of the wall, a lid hinged to the other end of the box, a U-shaped frame pivotally connected at its sides to the sides of the box, said frame being angular in cross section and having its transversely extending portion adapted to be inserted in the slot in the end of the box, and a bag connected to the box and lid and to said frame.

28. In a photographic flashlight apparatus, a housing, a cartridge magazine disposed in the housing, a firing chamber, means for shifting the cartridges one by one from the magazine into the firing chamber, means for firing the cartridge, a spent cartridge receptacle detachably mounted in the bottom of the housing, and means for tilting the firing chamber to discharge the spent cartridges into said receptacle.

In testimony whereof I hereunto affix my signature in the presence of two witnesses.

WILLIAM B. POYNTER.

Witnesses:
W. E. MAYER,
H. J. HEILKER.

Copies of this patent may be obtained for five cents each, by addressing the "Commissioner of Patents. Washington, D C."